G. W. Leffingwell.
Bee Hive.
Nº 66,977. Patented Jul. 23, 1867.

WITNESSES:
Geo. Graham
John Howard

INVENTOR:
George W. Leffingwell

United States Patent Office.

GEORGE W. LEFFINGWELL, OF COLUMBUS, WISCONSIN.

Letters Patent No. 66,977, dated July 23, 1867.

---

IMPROVEMENT IN BEE-HIVES.

---

The Schedule referred to in these Letters Patent and making part of the same.

---

Be it known that I, GEORGE W. LEFFINGWELL, of Columbus, in the county of Columbia, and State of Wisconsin, have invented a new and useful Improvement in Bee-Hives, to wit, a plan or method for connecting the open frames used for holding the honey-comb and of suspending the same within the hive; and I do hereby declare that the following is a full, clear, and exact description of the construction and operation of the same, reference being had to the annexed drawings, making a part of this specification, in which—

Figure 1:
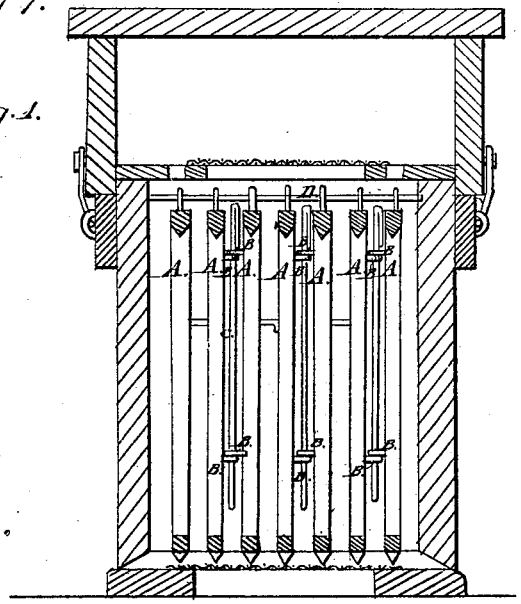
Figure 2:
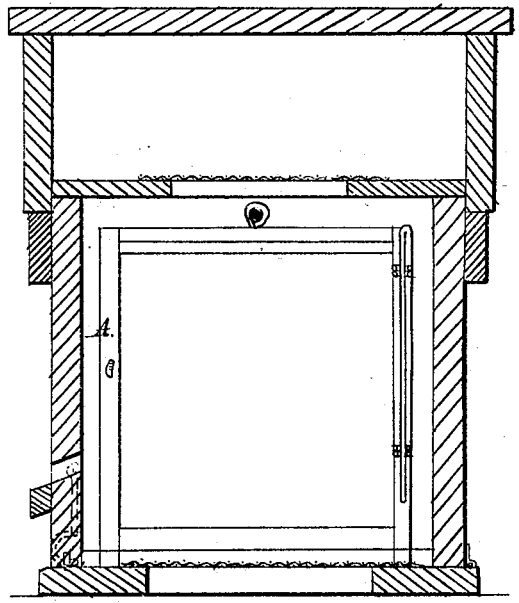

Figure 1 is a view of the group or frames as connected and in their place in the hive, and Figure 2 represents a lateral view of the outside frame, with the method of its connection with the rest of the group.

A A A A A A A represent the frames; B B represent the loops; C represents the wire rod dropping down perpendicularly through the loops B B, and thus connecting them, and at the same time serving as a hinge, by means of which they are fastened on alternate sides, so as to open laterally; D represents the rod used in suspending the frames within the hive, as shown in fig. 1. By means of this plan for connecting the frames they can be placed in position and removed from the hive together, and when removed can be opened laterally or separated without injury to the bees or waste of honey, and any one of the frames can be taken from the group and the residue connected by the same means and restored to their position in the hive.

What I claim, and desire to secure by Letters Patent, is—

Connecting the swing comb-frames together by means of metallic loops or staples B B, fixed in alternate sides of the frames A, and a movable wire or rod, C, passing perpendicularly through the same, so arranged as to permit the frames to open from alternate sides, substantially as and for the purpose described.

GEORGE W. LEFFINGWELL.

Witnesses:
G. W. HAZELTON,
CHAS. L. DERING.